United States Patent
Chen

Patent Number: 6,134,456
Date of Patent: Oct. 17, 2000

[54] INTEGRATED MOBILE-PHONE HANDSFREE KIT COMBINING WITH VEHICULAR STEREO LOUDSPEAKERS

[75] Inventor: Stephen Chen, Chang Hua, Taiwan

[73] Assignee: E. Lead Electronic Co., Ltd., Chang Hua, Taiwan

[21] Appl. No.: 09/094,892

[22] Filed: Jun. 15, 1998

[51] Int. Cl.[7] .................................................. H04Q 7/32
[52] U.S. Cl. .......................... 455/569; 455/556; 455/345
[58] Field of Search .................................. 455/569, 426, 455/422, 556, 557, 345

[56] References Cited

U.S. PATENT DOCUMENTS

| | | | |
|---|---|---|---|
| 5,243,640 | 9/1993 | Hadley et al. | 455/426 |
| 5,722,069 | 2/1998 | Donner | 455/422 |
| 5,754,962 | 5/1998 | Griffin | 455/569 |
| 5,867,794 | 2/1999 | Hayes et al. | 455/569 |
| 5,991,640 | 11/1999 | Lilja et al. | 455/569 |

*Primary Examiner*—Thanh Cong Le
*Assistant Examiner*—Myron K. Wyche
*Attorney, Agent, or Firm*—Alan Kamrath Oppenheimer Wolff & Donnelly LLP

[57] ABSTRACT

An integrated mobile-phone handsfree kit combined with an existing vehicular stereo system utilizes the high power and high performance audio output characteristics to provide drivers with a safe, comfortable and high quality conversation environment in vehicle. The invention comprises an existing stereo equipment with loudspeakers, and an electric power module connected to the stereo equipment to share the same power supply. The stereo equipment has a sound output wire and an electric power supply input wire. The electric power module has a handsfree kit electric circuit assembly. The handsfree kit electric circuit assembly has a sound source selecting switch unit, a power amplifier, an earphone circuit, an audio fidelity processing unit, an electric power supply unit, a sound source control unit, and an electric power supply switch. The invention makes it possible to integrate the mobile-phone handsfree kit together with a vehicular stereo system to automatically detect the sound source(from stereo or mobile-phone) and then direct the audio signal to the loudspeaker output, and therefore simplifies wiring and eliminates the needs for extra power source and loudspeakers. The integrated handsfree kit also controls the loudspeakers in different locations by applying various output powers and phase delays for each loudspeaker in order to process the audio signal and simulate the sound fields as if the sound were coming from the front to allow drivers to concentrate on traffic while in conversation via mobile-phone.

3 Claims, 6 Drawing Sheets

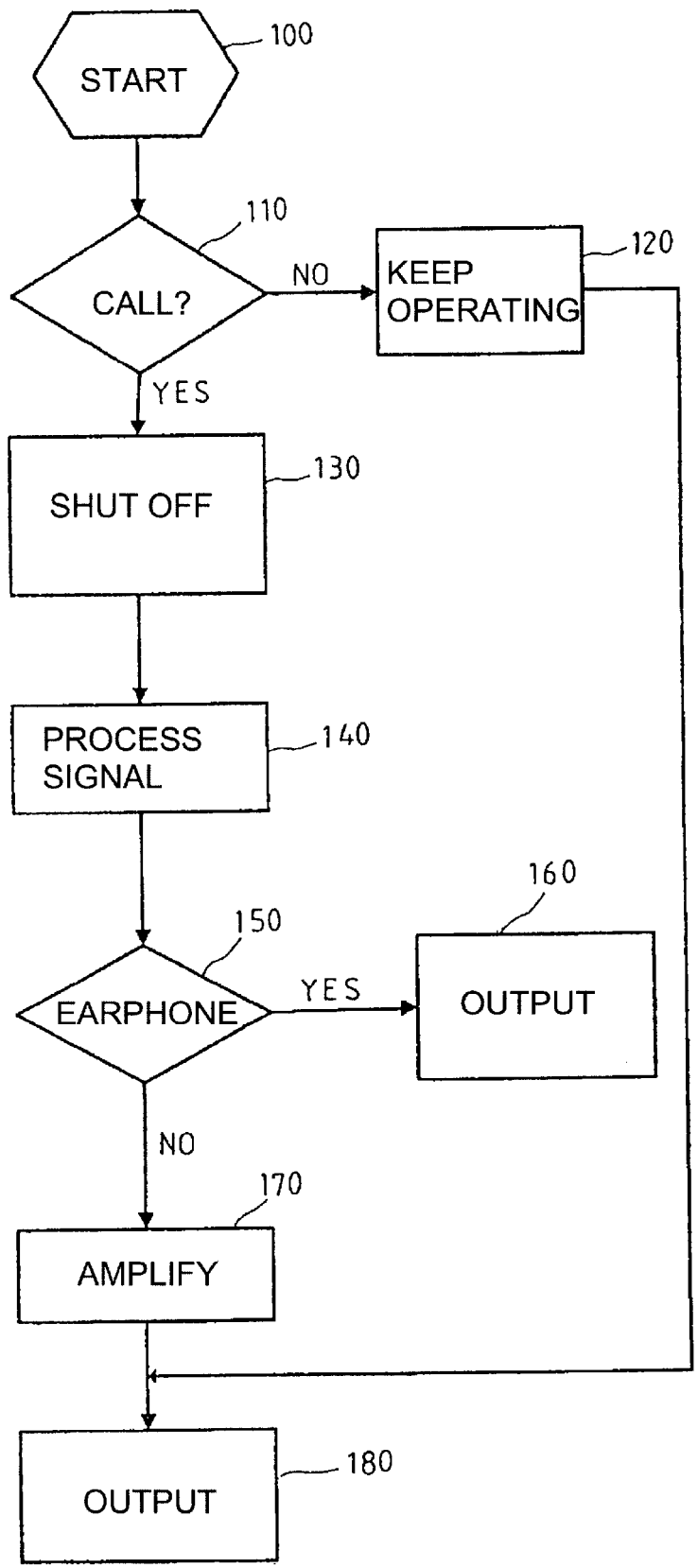
F I G. 4

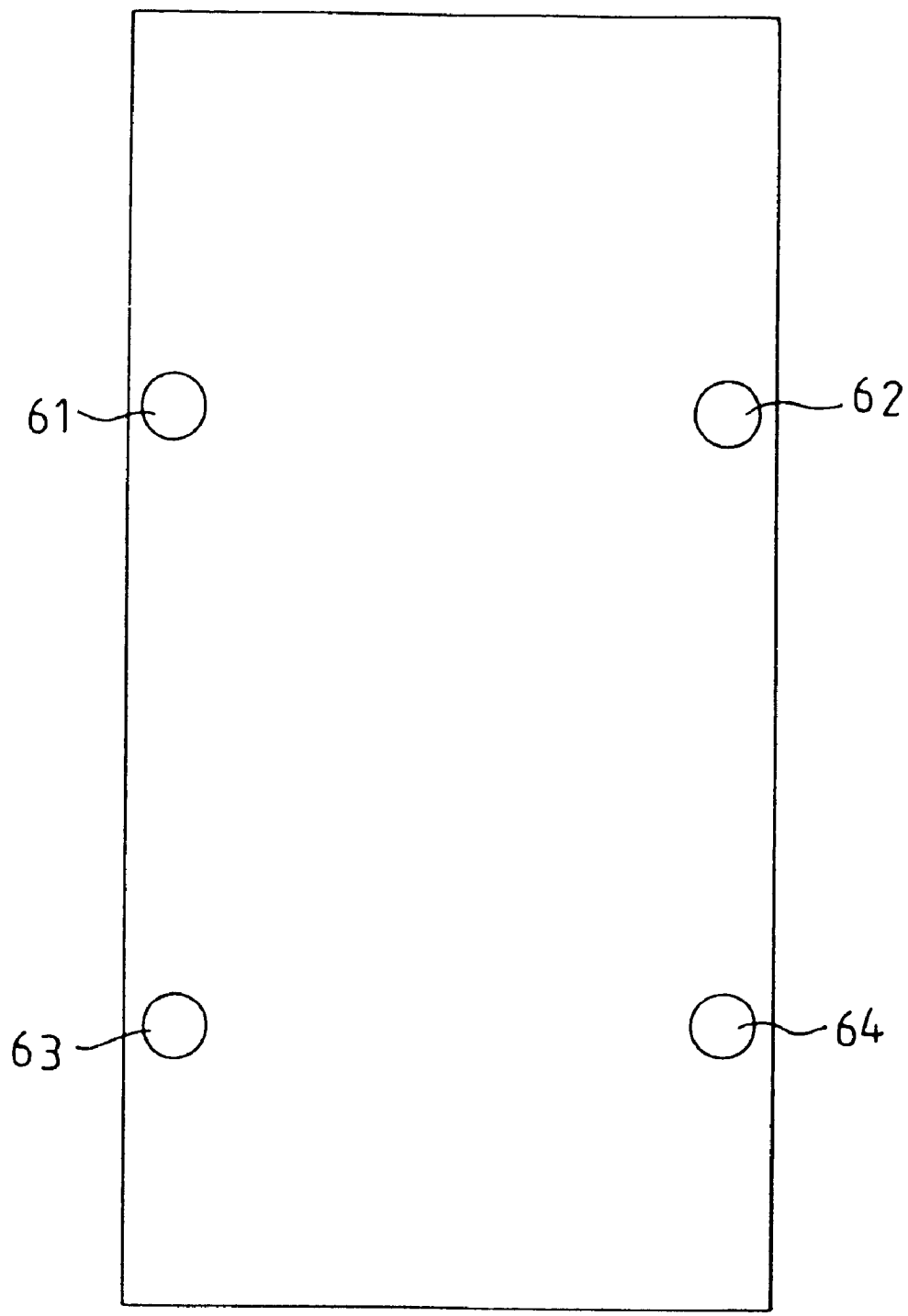
F I G. 5

6,134,456

INTEGRATED MOBILE-PHONE HANDSFREE KIT COMBINING WITH VEHICULAR STEREO LOUDSPEAKERS

BACKGROUND OF THE INVENTION

1. Field of the Invention

The present invention relates to combining an integrated handsfree kit of mobile-phone with an existing vehicular stereo acoustic loudspeaker. More particularly, the present invention relates to an integrated mobile-phone handsfree kit which can utilize the high power and high fidelity characteristics of the existing vehicular stereo system, to power the mobile-phone handsfree kit with internal stereo power cord for simplifying interior wiring and power problems. The invention also detects and controls the sound source (stereo system or mobile-phone) for loudspeaker output and simulates the sound field of audio conversation to highly improve audio quality of wireless communication.

2. Description of the Related Prior Art

Referring to FIG. 1, a conventional mobile-phone handsfree kit assembly comprises a main electric circuit unit 43, a mobile-phone holder 45, a plug 44 engaging with a cigarette lighter 100, a microphone 41, a external loudspeaker 42 disposed on dashboard 3, and an electric power supply wire 441 connected between the plug 44 and the main electric circuit unit 43. A plurality of electric wires 421 which are disposed in an interior of a vehicle may be tangled together and causes driving interference. The mobile-phone holder 45 is to hold and fasten the mobile-phone set 46. Therefore, the conventional mobile-phone handsfree assembly is very inconvenient for the users to talk with mobile-phone while driving.

SUMMARY OF THE INVENTION

The primary object of the present invention is to provide drivers an integrated communication system of a mobile-phone handsfree kit combining with existing vehicular stereo equipment, which can utilize the sound output loudspeakers to provide excellent audio quality for conversation besides normal vehicular stereo function for entertainment.

It is also an object of the present invention to integrate the power supply of the mobile-phone handsfree kit together with that of an existing vehicular stereo system. The mobile-phone handsfree kit utilizes and shares the same existing internal electric power supply terminal of the stereo system instead of extra wiring to simplify the installation and to avoid multiple power supplies and wiring confusion.

It is also an object of the present invention to control and switch the loudspeaker output between a sound source of the stereo equipment and a conversation audio source of a mobile-phone, depending on whether the mobile-phone is in communication or not.

It is also another object of the present invention to control the loudspeakers in different locations by applying various output powers and phase delays for each loudspeaker in order to process the audio signal and simulate the sound fields as if the sound is coming from the front.

Accordingly, an integrated mobile-phone handsfree kit combined with a vehicular stereo loudspeaker system comprises a handsfree kit electric circuit assembly and preinstallated loudspeakers. The mobile-phone handsfree kit electric circuit assembly is an interface of both the the audio signal stream and the power supply. As to the audio signal interface, it is disposed between a sound output signal wire from the stereo system or from mobile-phone and a sound output loudspeaker. As to the power supply interface, it is disposed between an electric power supply wire of the stereo system and an electric power input wire from the vehicular power supply system. The handsfree kit electric circuit assembly and vehicular stereo equipment thereby share the same electric power supply and audio output loudspeakers. The handsfree kit electric circuit assembly controls and switches the loudspeaker output between a sound Source of the stereo equipment and a conversation audio source of a mobile-phone. The handsfree electric circuit assembly does not need an additional electric power supply such as conventionally from a cigarette lighter plug and does not need an additional external audio output loudspeaker.

BRIEF DESCRIPTION OF THE DRAWINGS

FIG. 4 is a flow chart illustrating an operation of an integrated mobile-phone handsfree kit combined with a vehicular loudspeaker of a first preferred embodiment in accordance with the present invention;

FIG. 5 Is a schematic view illustrating a normal four-loudspeaker set of a vehicular stereo system disposed in a vehicle.

DETAILED DESCRIPTION OF THE INVENTION

Figure 1:
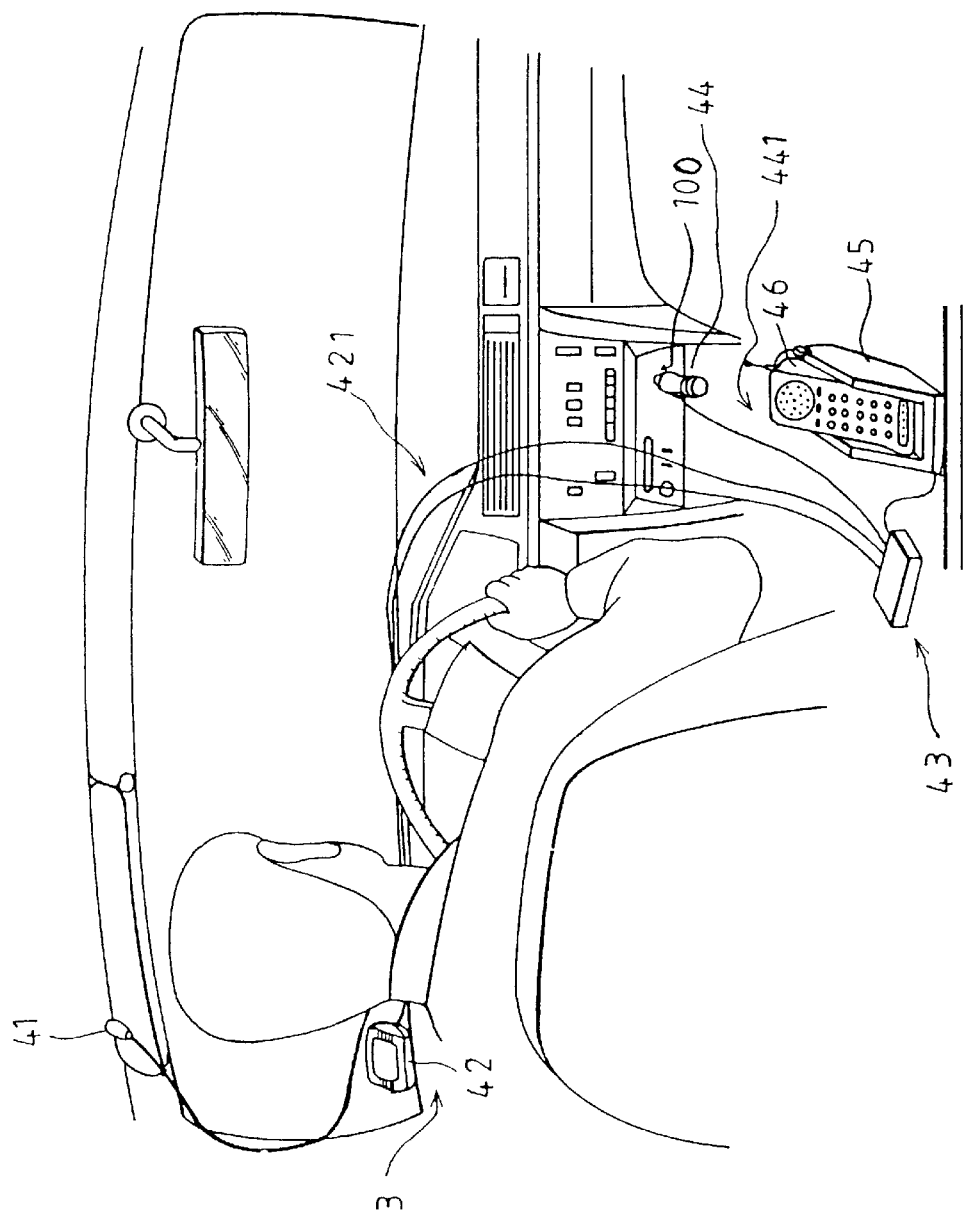
FIG. 1 is a perspective schematic view illustrating a conventional mobile-phone handsfree assembly of the prior art installed in an interior of a vehicle.
Figure 2:
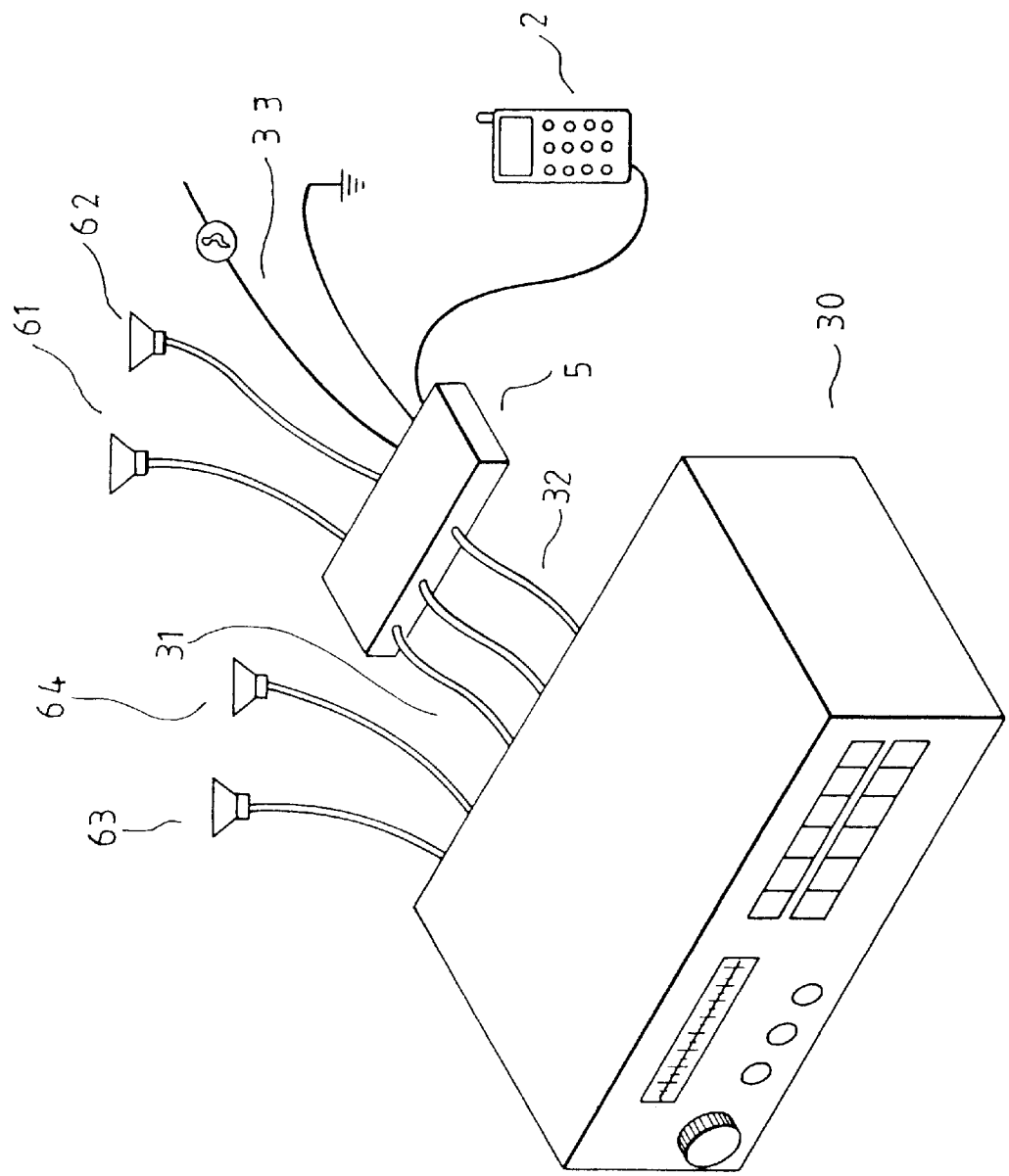
FIG. 2 is a perspective assembly view of vehicular stereo equipment and a mobile-phone handsfree kit combined with an existing vehicular loudspeaker of a first preferred embodiment in accordance with the present invention.
Figure 3:
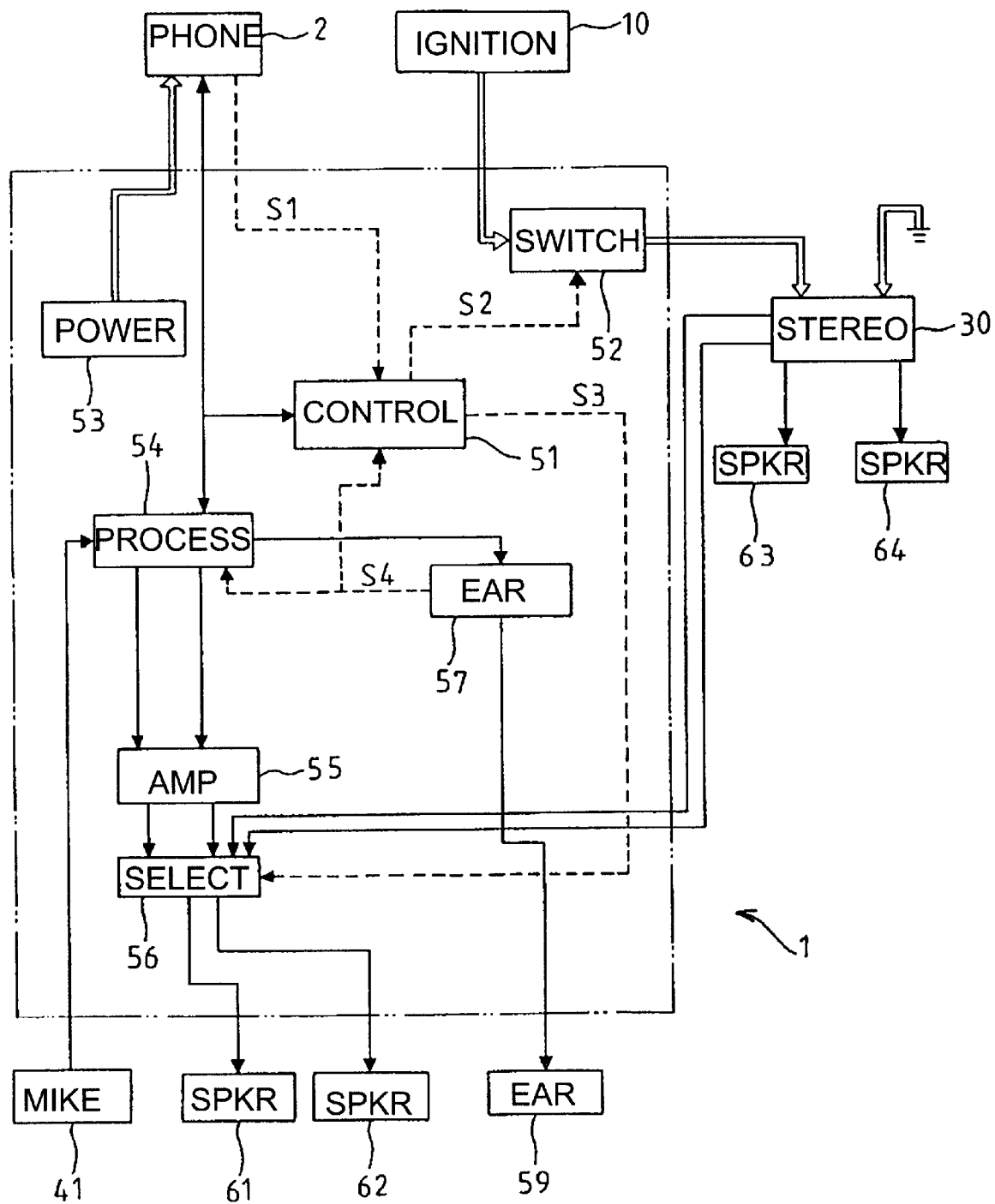
FIG. 3 is a block diagram of an integrated mobile-phone handsfree kit combined with a vehicular loudspeaker of a first preferred embodiment in accordance with the present invention.

Referring to FIGS. 2 to 5, an integrated mobile-phone handsfree kit combined with vehicular stereo loudspeaker system comprises a vehicular stereo equipment 30, and an electric power and control module 1 connected to the stereo equipment 30. The vehicular stereo equipment 30 is then connected to a sound output wire 31 and an electric power supply input wire 32. The electric power and control module 1 comprises a handsfree kit electric circuit assembly 5. The handsfree kit electric circuit assembly 5 is an audio and power supply interface which is disposed between the sound output wire 31 and a first loudspeaker 61 and a second loudspeaker 62. It is also connected between an electric power supply wire 33 and the stereo power supply input wire 32. The handsfree kit electric circuit assembly 5 and the stereo equipment 30 thereby share an electric power supply, the first loudspeaker 61 and the second loudspeaker 62. The handsfree kit electric circuit assembly switches and directs the loudspeaker output between a sound source of the stereo equipment 30 and an audio source of a mobile-phone 2 according to an operation of the mobile-phone 2 communication. The handsfree kit electric circuit assembly 5 thereby eliminates the need for an additional electric power supply and an additional external sound output loudspeaker.

The handsfree kit electric circuit assembly 5 comprises a sound source control unit 51, an electric power supply switch 52, an electric power supply unit 53, an audio fidelity processing unit 54, a power amplifier 55, a sound source selecting switch unit 56, and an earphone circuit 57. The sound source control unit 51 detects and recognizes whether the mobile-phone 2 is in operation for communication or not, in order to actuate the electric power supply switch 52. The electric power supply switch 52 is actuated by the sound source control unit 51 in order to turn on and turn off an electric power supply of the stereo equipment 30 temporarily. The electricity power supply unit 53 provides electricity for the mobile-phone 2 and also charges the battery of the mobile-phone 2. The audio fidelity processing unit 54 cancels an input acoustic echo and processes the audio signal in order to maintain the high fidelity of audio quality. The power amplifier 55 amplifies an output audio signal of the mobile-phone 2 to an acceptable sound level. The sound source selecting switch unit 56 is actuated by the sound source control unit 51 in order to detect and control whether a sound source of a sound output loudspeaker is coming from the power amplifier 55 or from the stereo equipment 30. A first control line SI is connected to the sound source control unit 51 and the mobile-phone 2. A second control line S2 is connected to the sound source control unit 51 and the electric power supply switch 52. A third control line S3 is connected to the sound source control unit 51 and the sound source selecting switch unit 56. A fourth control line S4 is connected to the earphone circuit 57, the audio fidelity processing unit 54, and the sound source control unit 51. A microphone 41, the first loudspeaker 61, the second loudspeaker 62, and an carphone 59 are all connected to the handsfree kit electric circuit assembly 5. A third loudspeaker 63 and a fourth loudspeaker 64 are both connected to the vehicular stereo equipment 30. The vehicle ignition 10 is connected to the electric power supply switch 52.

Now referring to FIG. 4, the operation flow chart of the integrated mobile-phone handsfree kit comprises the following steps:

Step 100: Start.

Step 110: The sound source control unit 51 detects and determines whether an incoming phone call is received.

Step 120: The stereo equipment 30 operating.

Step 130: The electric power supply switch 52 shuts off the stereo equipment 30 keeps.

Step 140: The audio fidelity processing unit 54 eliminates the noise and cancels the acoustic echo to maintain the high fidelity of audio quality.

Step 150: The earphone 59 is connected to the earphone circuit 57.

Step 160: The sound signal is outputted via the earphone 59.

Step 170: The power amplifier 55 amplifies an output audio signal of the mobile-phone 2.

Step 180: The sound source selecting switch unit 56 selects and determines a predetermined loudspeaker to output the sound signal. The sound source selecting switch unit 56 is controlled by the sound source control unit 51.

Figure 6:
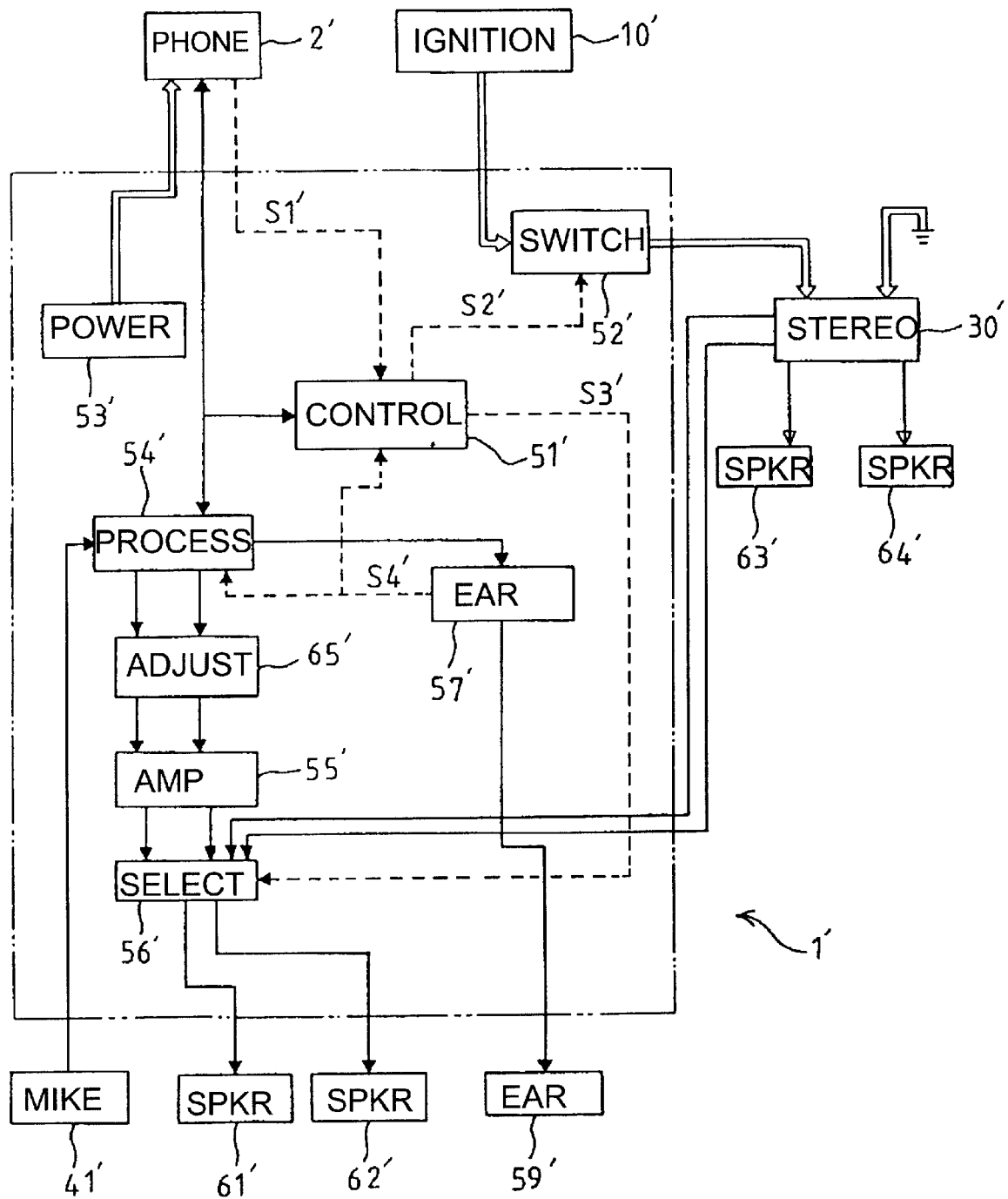
FIG. 6 is a block diagram of an integrated mobile-phone handsfree kit combined with a vehicular loudspeaker of a second preferred embodiment in accordance with the present invention.

Referring to FIG. 6, another mobile-phone assembly comprises stereo equipment 30', and an electric power and control module 1' connected to the stereo equipment 30'. The stereo equipment 30' comprises a sound output wire 31' and an electric power supply input wire 32'. The electric power and control module 1' comprises a sound source selecting switch unit 56', an adjustment/control unit 65', a power amplifier 55', an earphone circuit 57', an audio fidelity processing unit 54', an electric power supply unit 53', a sound source control unit 51', and an electric power supply switch 52'. A first control line S1' is connected to the sound source control unit 51' and the mobile-phone 2'. A second control line S2' is connected to the sound source control unit 51' and the electric power supply switch 52'. A third control line S3' is connected to the sound source control unit 51' and the sound source selecting switch unit 56'. A fourth control line S4' is connected to the earphone circuit 57', the audio fidelity processing unit 54', and the sound source control unit 51'. A microphone 41', the first loudspeaker 61', the second loudspeaker 62', and an earphone 59' are all connected to the electric power and control unit 1'. A third loudspeaker 63' and a fourth loudspeaker 64' are both connected to the vehicular stereo equipment 30'. The vehicle ignition 10' is connected to the electric power supply switch 52'. The adjustment/control unit 65' controls the loudspeakers in different locations applying various output powers and phase delays for each loudspeaker in order to process the audio signal and simulate the sound fields as if the sound is coming from the front.

The present invention in not limited to the embodiment mentioned above, but a variety of modifications thereof may be made for other applications. Further, various variations in form and detail may be made without departing from the scope of the present invention.

What is claimed is:

1. An integrated mobile-phone handsfree kit comprising, in combination:

a mobile-phone;

a vehicular stereo loudspeaker system including sound output loudspeakers; and a mobile-phone handsfree kit electric circuit assembly as an interface of both an audio signal stream and a vehicular electric power supply;

the mobile-phone handsfree kit electric circuit assembly, as for the audio signal stream interface, being disposed between a sound output signal wire from the vehicular stereo loudspeaker system or from the mobile-phone and the sound output loudspeakers;

the mobile-phone handsfree kit electric circuit assembly, as for the power supply interface, being disposed between an electric power supply wire of the vehicular stereo loudspeaker system and an electric power input wire from the vehicular electric power supply system, with the mobile-phone handsfree kit electric circuit assembly sharing the same vehicular electric power supply and the sound output loudspeakers of the vehicular stereo loudspeaker system;

wherein the handsfree mobile-phone kit electric circuit assembly controls and switches the loudspeaker output between a sound source of the vehicular stereo loudspeaker system and a conversation audio source of the mobile-phone, depending on whether the mobile-phone is in communication or not; and wherein the mobile-phone handsfree kit electric circuit assembly does not need an additional electric power supply as conventionally from a cigarette lighter plug and does not need an additional external audio output loudspeaker.

2. The integrated mobile-phone handsfree kit as claimed in claim 1, wherein the mobile-phone handsfree kit electric circuit assembly comprises a sound source control unit, an electric power supply switch, an electric power supply unit, an audio fidelity processing unit, a power amplifier, a sound source selecting switch unit, and an earphone circuit; wherein the sound source control unit detects and recognizes whether the mobile-phone is in operation for communication or not, in order to actuate the electric power supply switch; wherein the electric power supply switch is actuated by the sound source control unit in order to turn on and turn off the vehicular electric power supply to the vehicular stereo loudspeaker system temporarily; wherein the electric power supply unit provides electricity for the mobile-phone and also charges a battery of the mobile-phone; wherein the the fidelity processing unit cancels an input acoustic echo and processes the audio signal stream in order to maintain high fidelity; wherein the power amplifier amplifies an output audio signal of the mobile-phone to an acceptable sound level; and wherein the sound source selecting switch unit is actuated by the sound source control unit in order to detect and control whether a sound source of the sound output loudspeakers is coming from the power amplifier or from the vehicular loudspeaker stereo system.

3. The integrated mobile-phone handsfree kit as claimed in claim 1, wherein the mobile-phone handsfree kit electric circuit assembly comprises an adjustment/control unit controlling the sound output loudspeakers in different locations by applying various output powers and phase delays for each loudspeaker in order to process the audio signal and simulate the sound fields as if the sound were coming from the front to allow drivers to concentrate on traffic while in conversation via the mobile-phone.

* * * * *